United States Patent
Dubs et al.

(10) Patent No.: US 11,103,940 B2
(45) Date of Patent: Aug. 31, 2021

(54) METAL-CUTTING MACHINE TOOL

(71) Applicant: KOMET GROUP GMBH, Besigheim (DE)

(72) Inventors: Waldemar Dubs, Kornwestheim (DE); Steffen Schmid, Kirchheim (DE); Frederik Peters, Stuttgart (DE)

(73) Assignee: Komet Group GmbH, Besigheim (DE)

(*) Notice: Subject to any disclaimer, the term of this patent is extended or adjusted under 35 U.S.C. 154(b) by 130 days.

(21) Appl. No.: 16/228,221

(22) Filed: Dec. 20, 2018

(65) Prior Publication Data

US 2019/0118276 A1    Apr. 25, 2019

Related U.S. Application Data

(63) Continuation of application No. PCT/EP2017/066041, filed on Jun. 28, 2017.

(30) Foreign Application Priority Data

Jun. 28, 2016    (DE) .................... 102016111805.2

(51) Int. Cl.
*B23C 5/24*     (2006.01)
*B23D 77/02*    (2006.01)
*B23D 77/04*    (2006.01)

(52) U.S. Cl.
CPC .............. *B23C 5/24* (2013.01); *B23D 77/025* (2013.01); *B23D 77/042* (2013.01);
(Continued)

(58) Field of Classification Search
CPC ..... B23C 5/241; B23C 5/2427; B23C 5/2444; B23C 5/24; B23C 5/2462; B23C 5/2226;
(Continued)

(56) References Cited

U.S. PATENT DOCUMENTS 1,340,474 A * 5/1920 Cashman .................. B23C 5/22
                                                      407/33
2,975,507 A * 3/1961 Wilder ..................... B23G 5/18
                                                      407/11
(Continued)

FOREIGN PATENT DOCUMENTS

CN    1102366 A    5/1995
CN    1216490 A    5/1999
(Continued)

OTHER PUBLICATIONS

Description DE2342478A1 (translation) obtained at https://worldwide.espacenet.com/ (last visited Nov. 24, 2020).*
(Continued)

*Primary Examiner* — Ryan Rufo
(74) *Attorney, Agent, or Firm* — Bose McKinney & Evans LLP

(57) ABSTRACT

This disclosure relates to a metal-cutting machine tool with a base body, which is rotatable about an axis of rotation relative to a workpiece to be machined, at least one plate seat disposed outside the axis of rotation on the base body and a cutting insert, which is inserted into the plate seat and held therein by at least one fastening means and which is provided with a coating, at least in the area of its cutting edge. In order to compensate for positional tolerances, according to this disclosure the plate seat comprises a positioning surface oriented toward the axis of rotation, and the cutting insert has a reference surface lying against the positioning surface and facing away from the axis of rotation, for radially determining the position of its cutting edge, wherein the coating is also applied to the reference surface.

20 Claims, 6 Drawing Sheets

(52) U.S. Cl.
CPC .. *B23C 2200/161* (2013.01); *B23C 2210/161* (2013.01); *B23C 2210/168* (2013.01); *B23C 2228/10* (2013.01); *B23D 2277/063* (2013.01); *B23D 2277/2428* (2013.01); *B23D 2277/2442* (2013.01)

(58) Field of Classification Search
CPC ... B23C 5/2252; B23C 5/2278; B23C 5/2282; B23C 2210/168; B23C 2200/161; B23C 2200/367; B23D 77/025; B23D 77/042; B23D 77/04
See application file for complete search history.

(56) References Cited

U.S. PATENT DOCUMENTS

| | | | | |
|---|---|---|---|---|
| 3,820,849 | A * | 6/1974 | Lundstrom et al. | E21C 35/19 299/108 |
| 4,964,763 | A * | 10/1990 | Kieninger | B23C 5/207 407/101 |
| 5,542,795 | A * | 8/1996 | Mitchell | B23C 5/2221 407/35 |
| 5,733,075 | A * | 3/1998 | Basteck | B23B 29/16 408/199 |
| 5,890,846 | A | 4/1999 | Clark et al. | |
| 5,957,629 | A * | 9/1999 | Hessman | B23C 5/202 407/113 |
| 6,203,251 | B1 * | 3/2001 | Oppelt | B23C 5/109 407/113 |
| 6,413,021 | B1 * | 7/2002 | Koch | B23D 77/025 407/43 |
| 7,802,944 | B2 * | 9/2010 | Engstrom | B23C 5/2247 407/66 |
| 2002/0037199 | A1 * | 3/2002 | Satran | B23C 5/207 407/54 |
| 2002/0085887 | A1 | 7/2002 | Schneider et al. | |
| 2003/0063954 | A1 | 4/2003 | Nerlich et al. | |
| 2004/0156688 | A1 * | 8/2004 | Matheis | B23C 5/2406 407/79 |
| 2004/0172828 | A1 | 9/2004 | Kammerer | |
| 2005/0158132 | A1 * | 7/2005 | Pantzar | B23C 3/30 407/48 |
| 2007/0065239 | A1 * | 3/2007 | Obkircher | B23C 5/2221 407/33 |
| 2007/0071559 | A1 | 3/2007 | Koskinen | |
| 2007/0248425 | A1 | 10/2007 | Andersson et al. | |
| 2007/0274791 | A1 * | 11/2007 | Pantzar | B23C 5/22 407/38 |
| 2010/0183384 | A1 | 7/2010 | Kruszynski et al. | |
| 2011/0097165 | A1 * | 4/2011 | Choi | B23C 5/2226 407/46 |
| 2011/0274506 | A1 | 11/2011 | Kakai | |
| 2012/0269593 | A1 | 10/2012 | Hansson | |
| 2013/0142580 | A1 | 6/2013 | Konta | |
| 2015/0063927 | A1 | 3/2015 | Sjoo | |
| 2015/0158090 | A1 | 6/2015 | Hecht | |
| 2015/0158091 | A1 * | 6/2015 | Hecht | B23C 5/207 407/47 |
| 2015/0217387 | A1 * | 8/2015 | Kress | B23D 77/04 408/197 |
| 2016/0008900 | A1 | 1/2016 | Sjoo | |
| 2016/0039010 | A1 | 2/2016 | Setoyama et al. | |
| 2016/0288225 | A1 * | 10/2016 | Lee | B23C 5/2221 |

FOREIGN PATENT DOCUMENTS

| | | | |
|---|---|---|---|
| CN | 101426607 A | 5/2009 | |
| CN | 102240826 A | 11/2011 | |
| CN | 102528168 A | 7/2012 | |
| CN | 103118823 A | 5/2013 | |
| CN | 104416208 A | 3/2015 | |
| CN | 105252085 A | 1/2016 | |
| DE | 2342478 A1 * | 2/1975 | ........... B23C 5/2472 |
| DE | 19847227 A1 * | 4/2000 | ............ B23C 5/207 |
| DE | 600 06 017 T2 | 7/2004 | |
| DE | 10 2006 028 729 A1 | 12/2007 | |
| DE | 10 2011 051 374 A1 | 12/2012 | |
| EP | 1 184 116 A1 | 3/2002 | |
| EP | 1 291 105 A1 | 3/2003 | |
| EP | 1 862 240 A1 | 12/2007 | |
| EP | 2859977 A1 * | 4/2015 | ............... B23C 5/22 |
| EP | 2 979 798 A1 | 2/2016 | |
| FR | 2615769 A1 * | 12/1988 | ............ B23C 5/207 |
| FR | 2746044 A1 * | 9/1997 | ........... B23D 61/065 |
| WO | WO-2010101503 A1 * | 9/2010 | ............... B23C 5/06 |
| WO | WO 2014/156446 A1 | 10/2014 | |

OTHER PUBLICATIONS

English translation of the International Preliminary Report on Patentability, PCT/EP2017/066041, dated Aug. 23, 2018, 6 pages.
English translation of the International Search Report, PCT/EP2017/066041, dated Sep. 28, 2017, 3 pages.

* cited by examiner

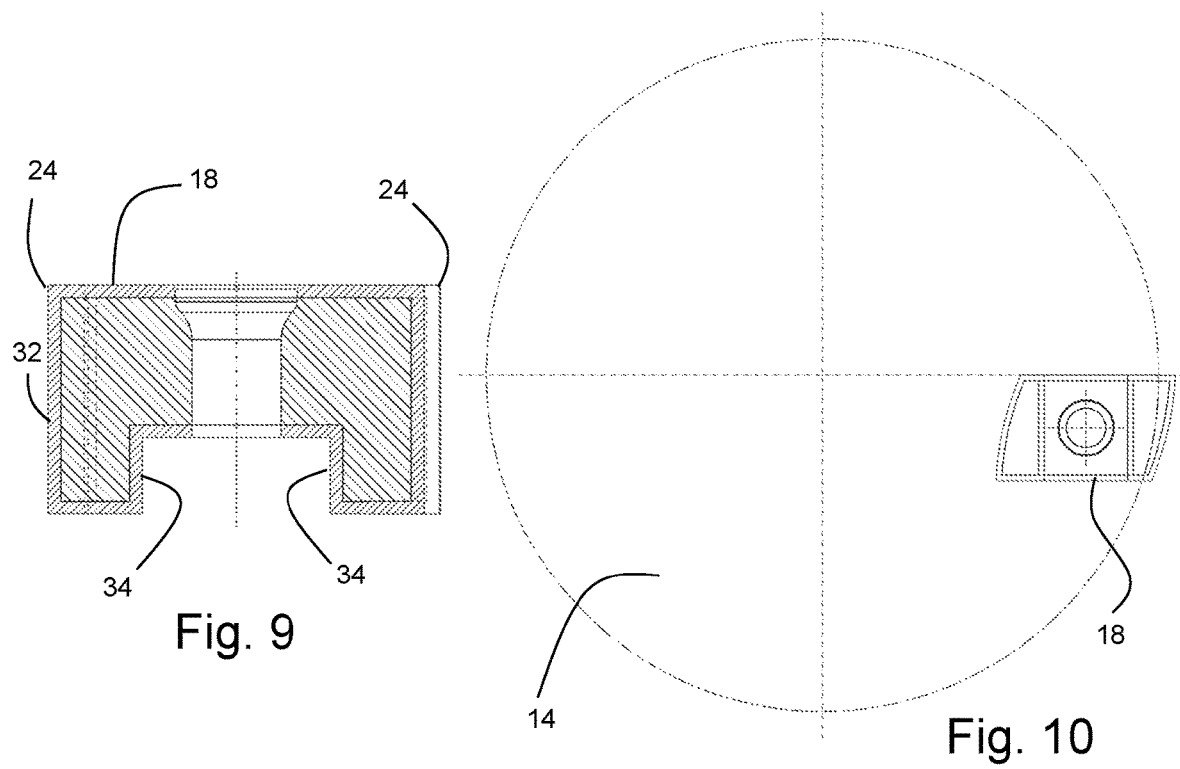
Fig. 9
Fig. 10
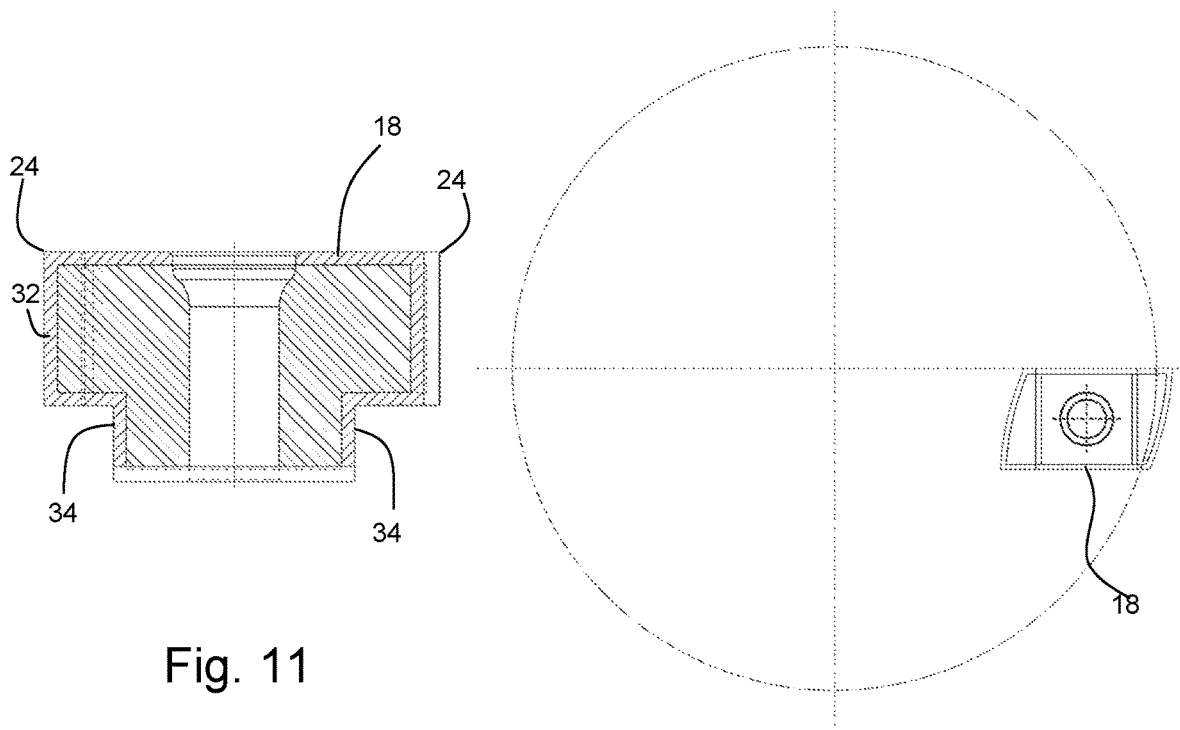
Fig. 11
Fig. 12

METAL-CUTTING MACHINE TOOL

RELATED APPLICATIONS

This application is a continuation of PCT/EP2017/066041, filed Jun. 28, 2017, which claims priority to DE 10 2016 111 805.2, filed Jun. 28, 2016, both of which are hereby incorporated herein by reference in their entirety.

BACKGROUND

This disclosure relates to a metal-cutting machine tool, in particular to a machine reaming tool, with a base body rotatable around a rotational axis, relative to the workpiece to be processed, with at least one plate seat arranged on the base body outside the rotational axis, and with a cutting plate inserted into the plate seat and held therein by at least one fastening means, and the cutting plate is provided with a coating at least in the region of its cutting edge.

For a cutting process, in particular the process of metal, but also of plastic-, fibrous- and composite materials, machine tools have proven themselves with replaceable (removable) cutting plates. These are used, for among other things, in drilling, milling, turning and reaming. In particular, reaming requires high accuracy of the machine tool radius or the accuracy of radial position of the cutting edge relative to the base body or to the tool/rotational axis. When reaming, the radius, on which the cutting edge is located, has direct influence on the generated diameter of the hole and thus the precision and possibly on the duration of the machine tool.

Depending on the type of the machine tool and the plate element as well as the manufacturing method, the achievable radial position accuracy of the cutting edge depends on various manufacturing tolerances, among others, manufacturing tolerances with respect to the position of the abutment and to the geometry of the plate element. In machine tools with coated cutting plates, the layer thickness and the layer thickness variance of the coating have a further influence on the radial position of the cutting edge. The sum of the manufacturing tolerances results in the deviation of the radial position of the cutting edge, which may result in different cutting plates. These tolerances limit the precision of the tool. The layer thicknesses in known cutting plates, depending on the field of application and coating methods, is in a range of 0.5 µm up to 50 µm. Here, depending on the coating methods, the tolerances of a few micrometers can occur. In this case, as a rule, the layer thickness variance has a double effect on the radial position of the cutting edge. The distance of the contact surface as well as the free surface from the center point of the cutting plate increases.

As a result, in certain cases, for example, where the abutment is approximately orthogonal to the connecting line between the center axis and the cutting edge of the tool, the diameter of the machine tool varies up to four times as much as the variance of the coating thickness. Thus, the tolerance of the layer thickness can alone represent a relatively large portion of the required total tolerance of the assembled machine tool.

In tight tolerances, which are required for reaming with a machine tool, this can lead to waste. The machine tool would not perform the function any longer, e.g., create too large or too small a bore or have too short a duration. If several plate elements are positioned on the machine tool, fluctuations in the layer thickness lead to concentricity errors. Due to the different radial positions of cutting edges, the load can be distributed unevenly on the cutting edges during the cutting process. Furthermore, it can cause a vibration excitation, because the notional center point of the cutting edge can be moved away from the rotational axis of the machine tool due to the concentricity error. With a tool, which is guided by plate elements, the concentricity error can thus result in a wobbling motion.

Starting from this, this disclosure further improves the machine tools known in the prior art in order to avoid the aforementioned disadvantages and in order to allow the positioning of coated cutting plates with accuracy and with comparatively little effort.

This disclosure is based on the idea of allowing a compensation of coating tolerances. Accordingly, it is proposed, according to this disclosure, that the plate seat has a positioning surface pointing towards the rotational axis, and that the cutting plate has a reference surface facing away from the rotational axis, lying against the positioning surface, for the radial position determination of its cutting edge, in which the coating is also applied to the reference surface. Because, due to the uniform coating, the layer thickness along the cutting edge and the layer thickness of the reference surface are approximately constant, the radial position of the cutting edge remains independent of the layer thickness, due to the surface pairing with the positioning surface. That is, the layer thickness and its tolerance have no or only a small influence on the position of the cutting edge and the precision of a machine tool. Thus, cutting plates, which have substantially identical dimensions in the uncoated state and are provided with the coatings of various thickness, are inserted into a given machine tool with high repeatable precision. Thus, it is not necessary to prepare different blanks for different coating thicknesses. Further, the thickness of the coating does not need to be accurately known. The position of the cutting edge does not differ between the cutting plates with different coatings. In this way, the precision of machine tools for reaming with coated cutting plates can be increased, and the manufacturing costs can be reduced and the duration increased.

Advantageously, the reference surface is transverse, in particular orthogonal, to the shortest connecting line running through the radially outer point of the cutting edge and the rotational axis. Thus, the radial compensation can be optimized.

In this context, it is particularly advantageous that the connecting line encloses a smallest angle in a range of 70° to 90°, preferably 80° to 90°, with the reference surface.

It is also advantageous, that the plate seat has a tangential support surface for receiving cutting forces, in which the tangential support surface should be as parallel as possible to a plane spanned through the rotational axis and the radially outer point of the cutting edge. Also, slightly inclined arrangements are conceivable, in which the support surface should enclose a smallest angle between 0° and 20°, preferably between 0° and 10° with said plane.

Advantageously, the cutting plate has a substrate made of a hard metal or cermet in order to ensure a long duration.

In principle, it is also possible that the cutting plate has a soldered cutting edge on a substrate, in which at least the cutting edge is provided with a coating.

A further advantageous embodiment provides that the coating is formed as a hard material coating, in particular as a ceramic hard material coating or a diamond coating, and has hardness of more than 800 HV (Vickers Pyramid Number) using the Vickers hardness test as of the priority date of the present application (i.e., Jun. 28, 2016) which is well known to those having ordinary skill in the art.

It is particularly advantageous that the layer thicknesses of the coating on the cutting edge and on the reference surface are substantially the same and in a range of 0.5 to 50 µm, preferably 1 to 30 µm.

In constructive terms, it is particularly advantageous that the reference surface is arranged on a stepped angle piece of the cutting plate so that the angle piece protrudes into the plate seats in the installed state of the cutting plate.

A further improvement provides that the plate seat has an axial support surface for the bottom surface of the cutting plate, pointing in the direction of the rotational axis, and that the positioning surface is arranged in a recess adjacent to the support surface.

To achieve a reliable compensation for replaceable plate elements, it is advantageous that a fastening means (fastener(s)) for the cutting plate is removable, and in the installed state, a force component directed against the positioning surface is exerted on the cutting plate.

In this context, it is also advantageous that a fastening means is formed by at least one element from the group of clamping screw, clamping spring, clamping wedge, and clamping claw.

In order to ensure a precisely defined, tilt-free support, it is advantageous that the positioning surface and the reference surface are formed flat or curved and lie flat against one another as a pair of surfaces. However, point- or line shaped supports are also conceivable.

Another advantage results from the fact that the cutting edge is ground to a nominal size in the uncoated state of the cutting plate. The tool can thus be ground directly to the desired diameter, in which the layer thickness does not need to be maintained during the grinding of the cutting plates or during the production of the plate seats.

An increase in the utility benefits can be achieved in that the cutting plate has at least two alternately engageable cutting edges and associated reference surfaces.

Advantageously, the cutting plate has a free-surface-bevel at the cutting edge, in which the free-surface-bevel and the reference surface have preferably a matching orientation for grinding together by a profile-grinding-disc. Thus, these surfaces can be generated in a common grinding process. This results in a very high accuracy of the surfaces to each other and thus a very high repeatable accuracy when replacing two plate elements, which have been produced in the same grinding process.

In order to allow a direct support, the plate seat is formed by the surface of the base body, facing the rotational axis.

In order to facilitate a plate change, it is advantageous that the plate seat is formed at least partially by a cutting plate holder, exchangeably fixable on the base body, in particular a cassette. In this case, also different size cassettes can be used for different cutting bodies.

Another improvement provides that the position of the positioning surface is adjustable by an adjusting means, optionally under the targeted deformation of the base body.

In order to allow a layer thickness compensation without additional axial displacement, it is advantageous that the plate seat on the side of the cutting plate, facing the rotational axis, has a free space for the radial compensation displacement of the cutting plate, depending on the thickness of the coating.

In this context, it is also advantageous that the cutting plate on its side facing the rotational axis stays free or spaced from a rigid counter surface of the plate seat, facing away from the rotational axis, and is optionally supported only by a fastening means.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIG. 9 shows a coated turning-cutting plate with a reference surface in a section view;

FIG. 10 is an end view of the turning-cutting plate of FIG. 9 shown in a sketched installation position; and FIGS. 11, 12, 13, 14, 15 and 16 show further embodiments of coated turning-cutting plates with the corresponding representations of the reference surface in FIGS. 9 and 10.

DESCRIPTION

Figure 1:
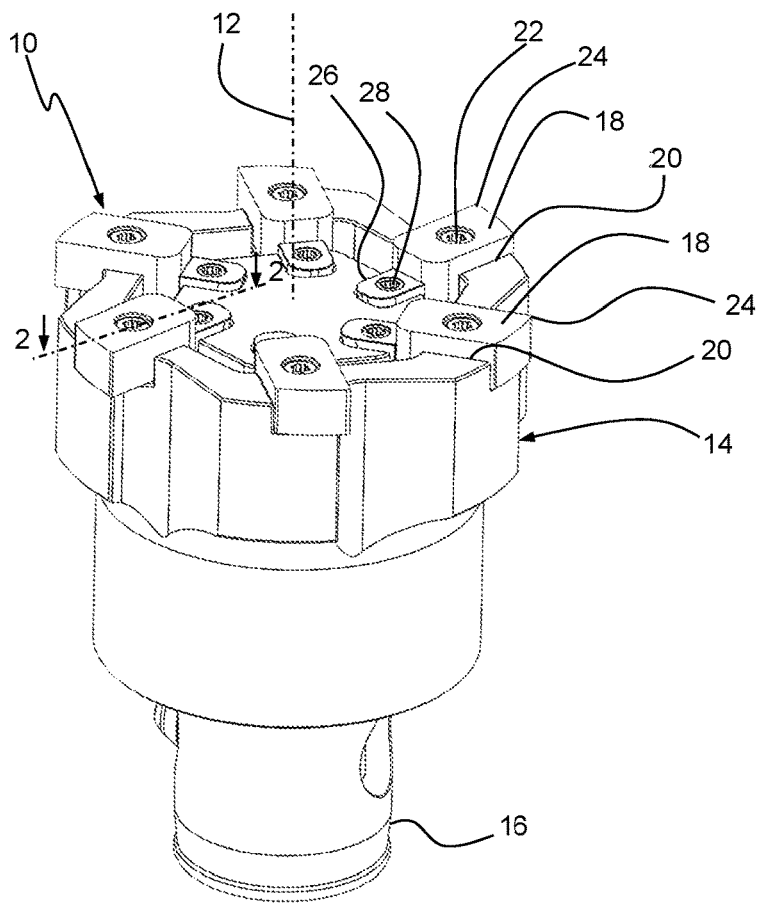
FIG. 1 is a perspective view of a machine reaming tool with coated cutting plates inserted in the plate seats of a base body.

The embodiments described below are not intended to be exhaustive or to limit the invention to the precise forms disclosed in the following description. Rather, the embodiments are chosen and described so that others skilled in the art may appreciate and understand the principles and practices of this disclosure.

For purposes of this disclosure, terms such as "horizontal" and "vertical" are generally used herein to establish positions of individual components relative to one another rather than an absolute angular position in space. Further, regardless of the reference frame, in this disclosure terms such as "vertical," "parallel," "horizontal," "right angle," "rectangular," "orthogonal" and the like are not used to connote exact mathematical orientations or geometries, unless explicitly stated, but are instead used as terms of approximation. With this understanding, the term "vertical," for example, certainly includes a structure that is positioned exactly 90 degrees from horizontal, but should generally be understood as meaning positioned up and down rather than side to side. Other terms used herein to connote orientation, position or shape should be similarly interpreted. Further, it should be understood that various structural terms used throughout this disclosure and claims should not receive a singular interpretation unless it is made explicit herein. By way of non-limiting example, the terms "plate seat," "cutting plate," "fastener," to name just a few, should be interpreted when appearing in this disclosure and claims to mean "one or more" or "at least one." All other terms used herein should be similarly interpreted unless it is made explicit that a singular interpretation is intended.

Reaming tools 10 shown in the drawing can be rotationally driven around a rotation- or tool axis 12 for the fine processing of a prefabricated bore in a workpiece by means of a machine tool, and thereby axially advance to cuttingly remove a reaming allowance, and thus to create a precisely fitting bore with a high surface quality. However, tool axis 12 can also be a rotational axis for a workpiece, which rotatingly moves around a tool axis for processing with a stationary machine tool.

Figure 2:
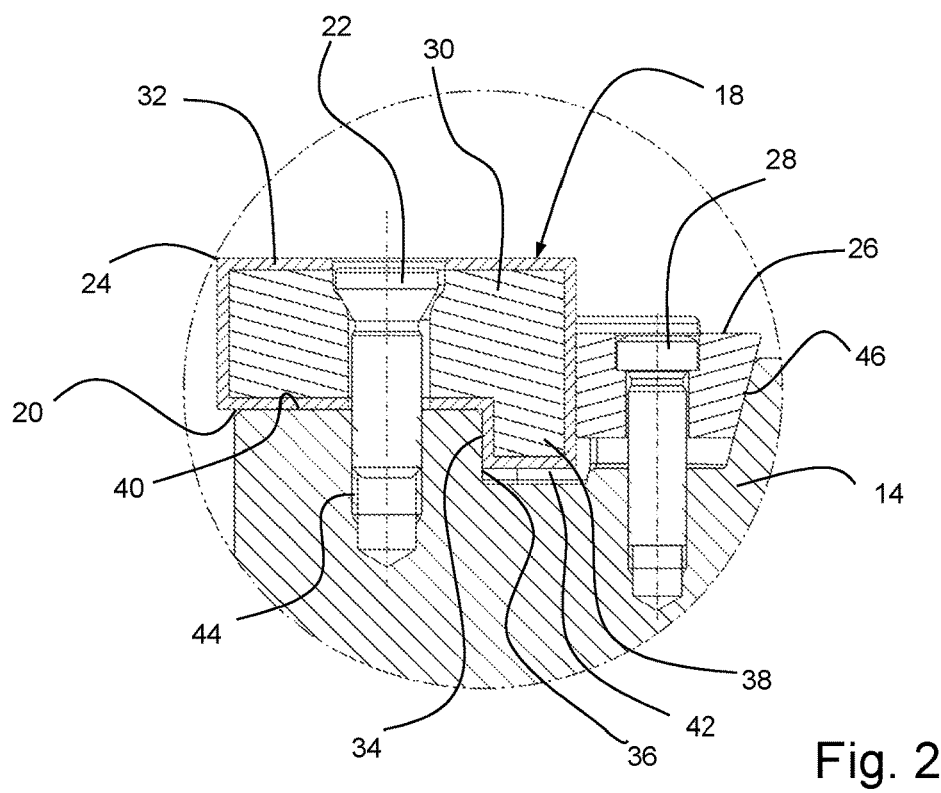
FIG. 2 is a partial sectional view through a cutting plate along the line 2-2 of FIG. 1, provided with a radial reference surface.

As shown in FIGS. 1 and 2, reaming tool 10 has base body 14, which is connectable to a recess, connectable to a machine spindle at its rear end via interface 16. At the front end of base body 14, a plurality of cutting plates 18 is fixed on each plate seat 20, distributed in the circumferential direction by means of clamping screws 22. The radially outer active cutting edge 24 of these cutting plates 18 revolves on a common cutting circle coaxial to the tool axis 12.

Plate seat 20 provides one or more thrust bearings, to which the associated cutting plate 18 is directly applied. The contact between the thrust bearing and cutting plate 18 can be generally surface-, line- or point contact. In this case, the thrust bearing is positioned so that cutting plate 18 is pressed by the force impact during the application (cutting forces) against one or more thrust bearing, thus the thrust bearing surfaces, in addition to the positioning of cutting plate 18, absorb the cutting forces and pass it to base body 14.

For additional radial clamping of cutting plates 18, respective clamping wedges 26 are provided, which are also retractable axially into base body 14 by means of screws 28, as will be described in more detail below.

As shown in FIG. 2, cutting plates 18 consist of a support body or substrate 30, for example, of a hard metal or cermet, and a full-surface hard material coating 32 applied to its outside surface. This may have a layer thickness, for example, in a range of 1 to 30 μm, of which the tolerance would affect the radial position of cutting edge 24 without compensating measures. To avoid this, cutting plate 18 has a reference surface 34, which, like cutting edge 24, is provided with coating 32 and abuts positioning surface 36 in the region of plate seat 20.

The location determination or compensation is carried out in that positioning surface 36 is oriented radially inwards to tool axis 12, whereas the coated reference surface 34 points radially outward, away from the tool axis 12, so that depending on the thickness of coating 32, a corresponding compensation of the radial position of cutting edge 24 is achieved. For this purpose, it is advantageous that reference surface 34 is orthogonal to a connecting line virtually running on the shortest distance through the radially outer point of cutting edge 24 and through rotational axis 12.

Suitably, such a compensatory surface pairing can be realized by a gradation or angle piece 38 of cutting plate 18, in which the angle piece 38 protrudes into plate seat 20 in the installed state of the cutting plate 18. It is favorable that plate seat 20 has axial support surface 40 pointing in the direction of rotational axis 12 for the bottom surface of cutting plate 18, so that positioning surface 36 can be arranged in recess 42 adjacent to support surface 40.

As seen in FIG. 2, clamping screw 22 is guided into the threaded bore of base body 14 under axial support surface 40 eccentrical to the opening of cutting plate 18, by which a force component against positioning surface 36 is directedly applied. In order to support the surface pressure and in order to ensure a reliable radial support of the cutting plate, clamping wedge 26 can be fixedly clamped to wedge slope 46 by means of screw 28. The wedge clamping results in an additional support of cutting plate 18 against radial forces from the machining process.

In the following embodiments, the same or similar parts are provided with the same reference numerals, as described above.

Figure 3:
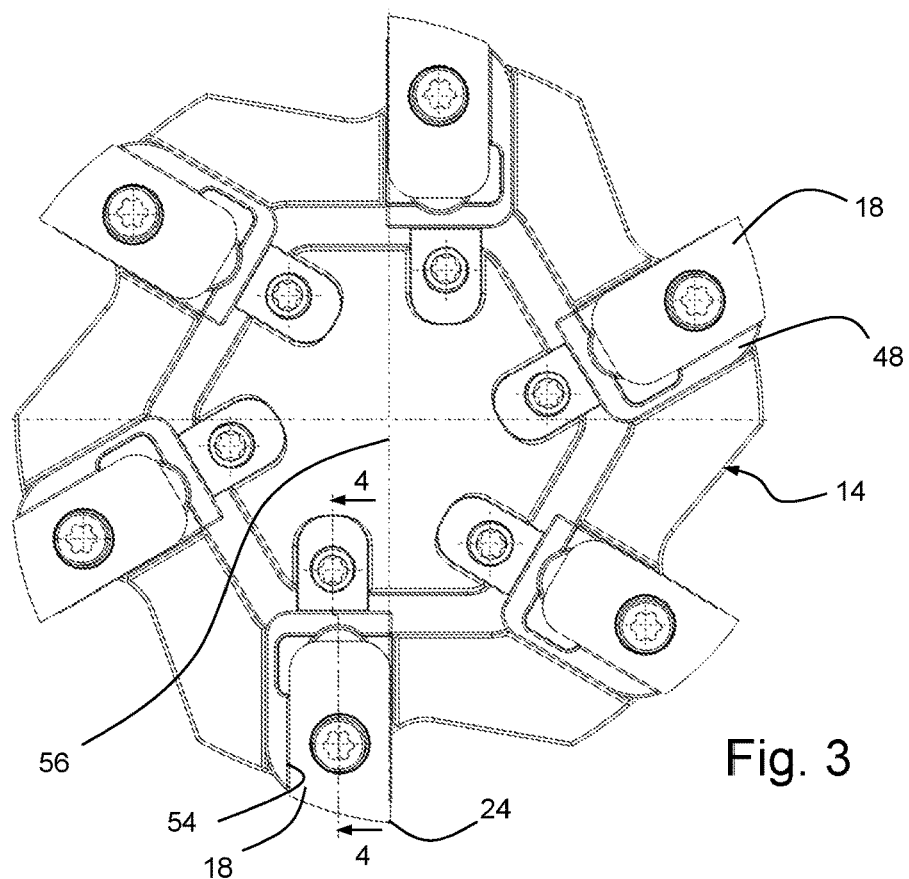
FIG. 3 is a front side view of an embodiment of a reaming tool with cutting plates in cassettes.
Figure 4:
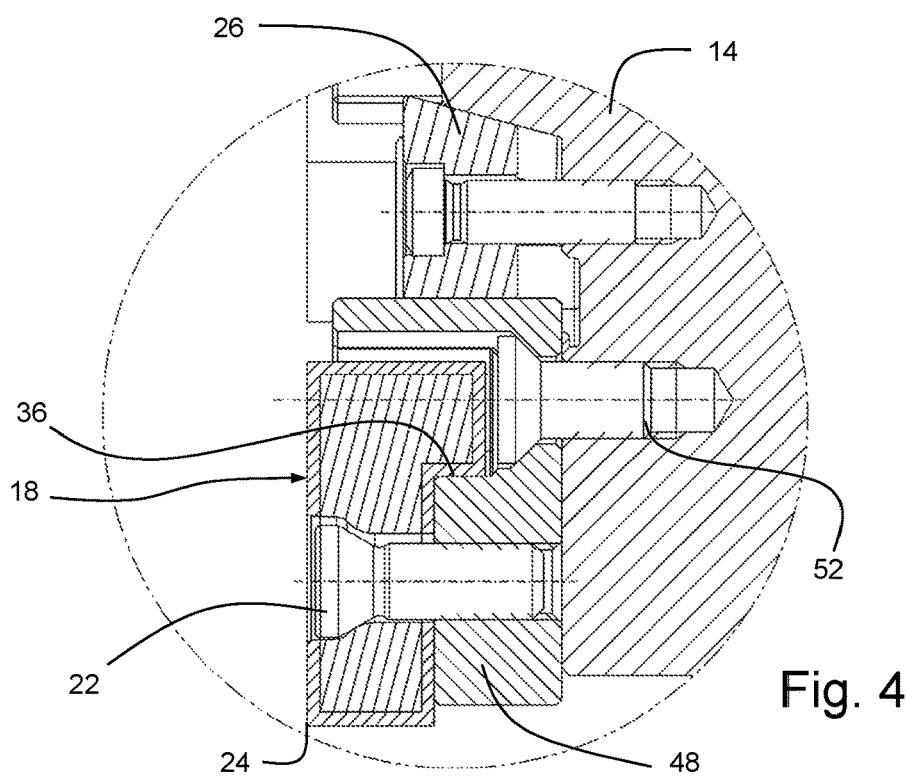
FIG. 4 is a partial sectional view along the line 4-4 of FIG. 3.

FIGS. 3 and 4 show an embodiment with cassettes 48 for indirectly holding cutting plates 18 on base body 14. Here, positioning surface 36 is formed as part of the plate seat in the respective cassettes 48.

Cassettes 48 can be fixed to base body 14 by means of screws 52 and supported radially adjustably by clamping wedges 26 as an adjustment means. Cutting plates 18 can be easily replaced, if necessary, by loosening their clamping screw 22. It is also conceivable that cassettes 48 can be optionally built on base body 14 in different sizes for different cutting plates 18.

As can also be seen from FIG. 3, the plate seat comprises support surface 54 with tangential surface normal for receiving tangential forces introduced to cutting edge 24. This tangential support surface 54 should be as parallel as possible to a plane 56 spanned through the rotational axis and the radially outer point of cutting edge, so that by the coating tolerances of cutting plate 18, only a tangential adjustment, but no appreciable radial adjustment of cutting edge 24, is carried out. When viewed from the perspective shown in FIG. 3, plane 56 defines a shortest imaginary connecting line running through a radially outer point of the cutting edge and the rotational axis and enclosing a smallest angle in a range of 80° to 90° with the reference surface.

Figure 5:
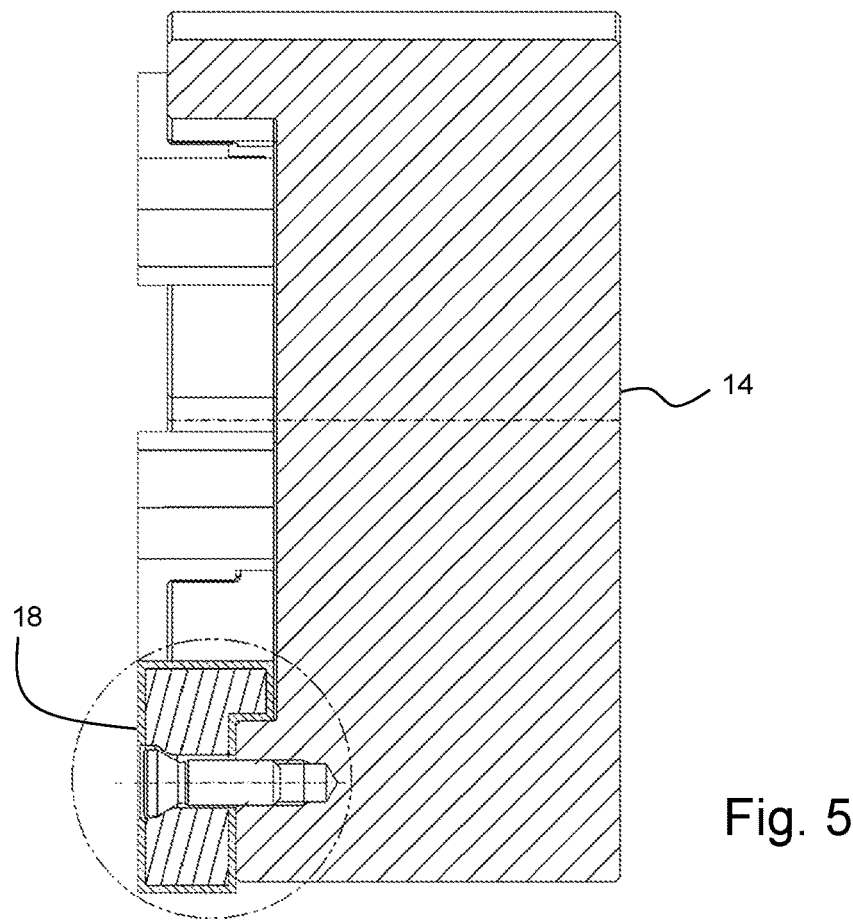
FIGS. 5 and 6 show another embodiment of a reaming tool with a screw-clamping cutting plate against a positioning surface, in an axial section and in a sectioned enlargement.
Figure 6:
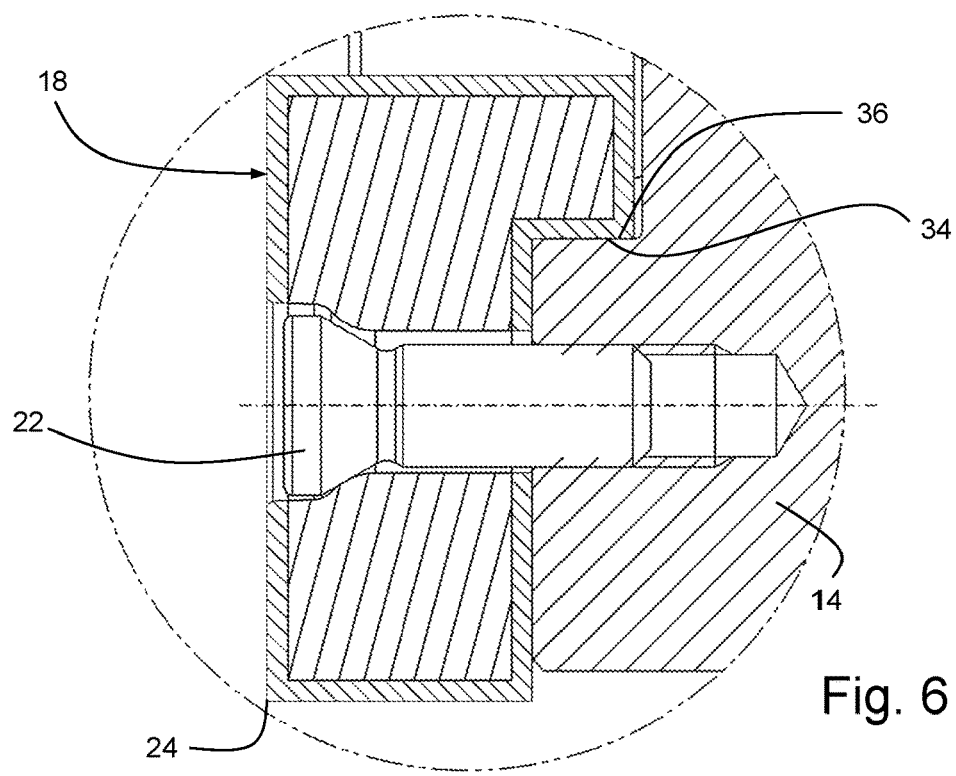

FIGS. 5 and 6 show a particularly simple embodiment, in which each of the cutting plates are held in base body 14 only by clamping screw 22 without additional elements. Again here, by an eccentric screw-through, the radial clamping of reference surface 34 is achieved against positioning surface 36.

Figure 7:
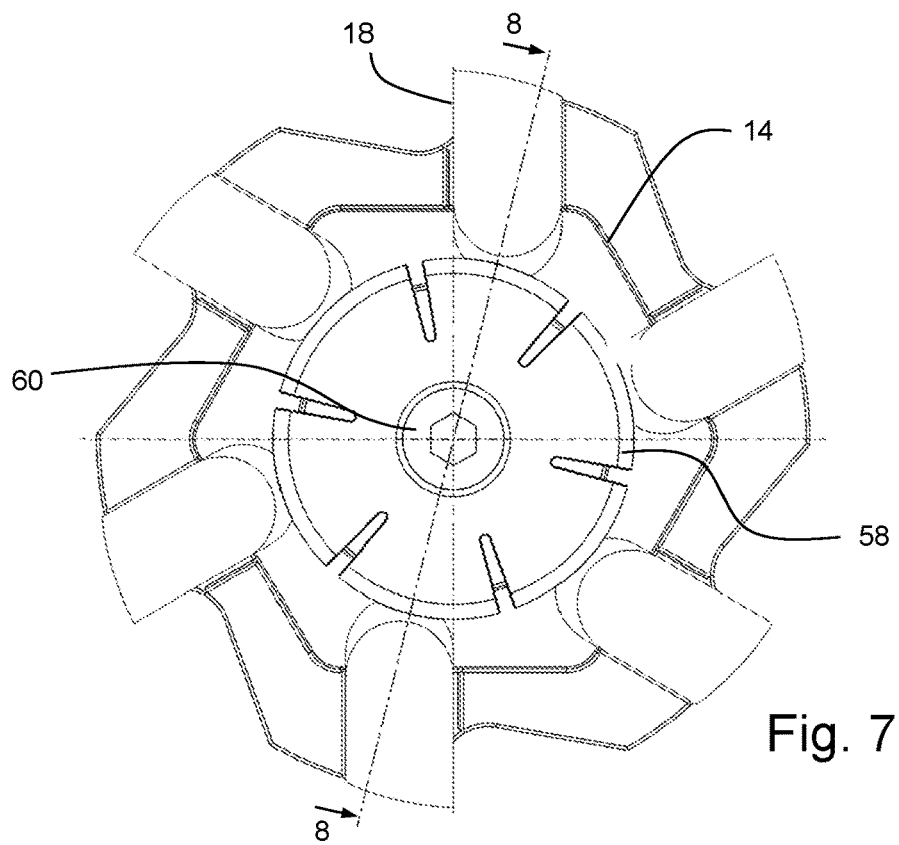
FIGS. 7 and 8 show an embodiment of a reaming tool with spring-clamping cutting plates against each positioning surface, in an end view and in an axial section along the line 8-8 of FIG. 7.
Figure 8:
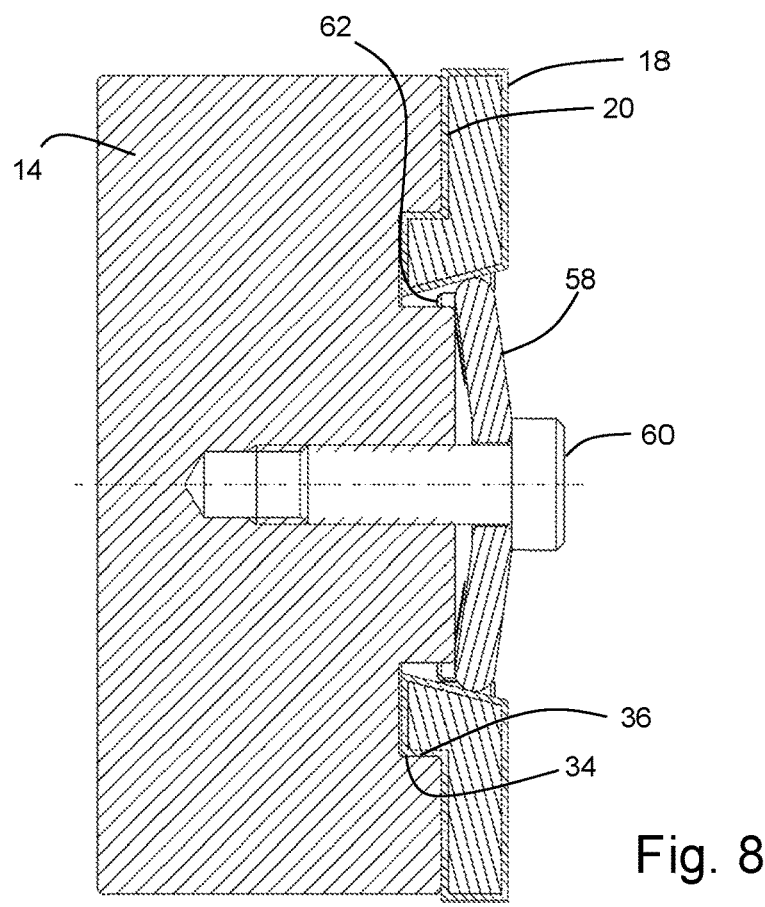
Figure 13:
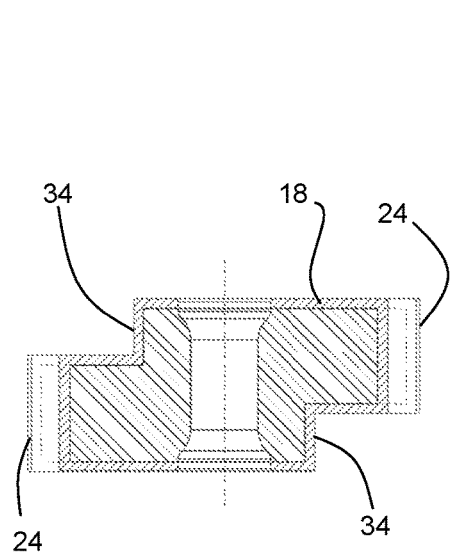
Figure 14:
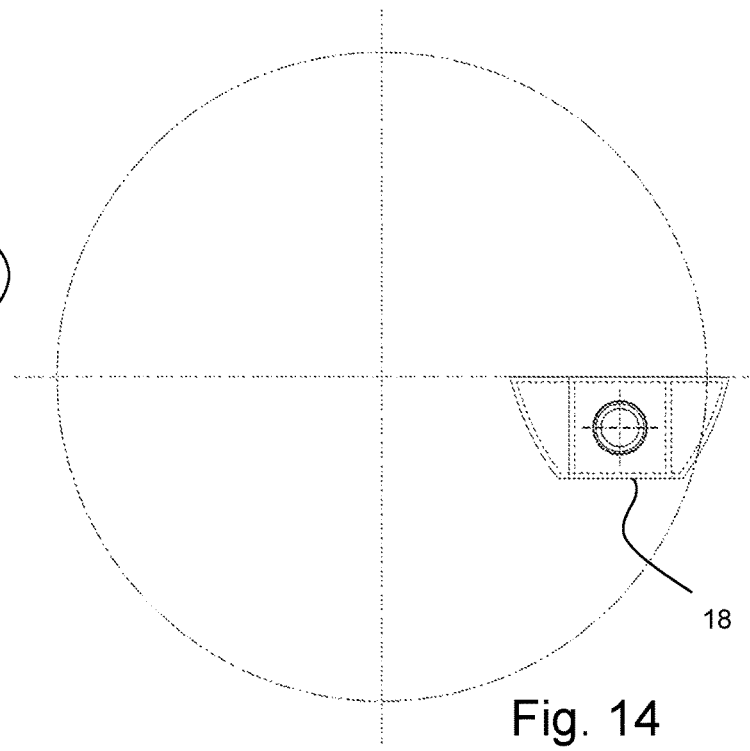
Figure 15:
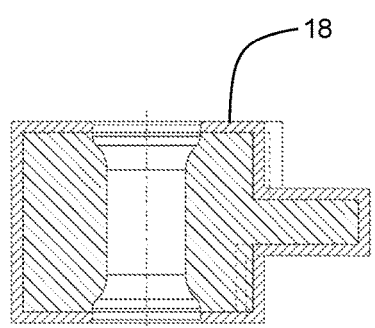
Figure 16:
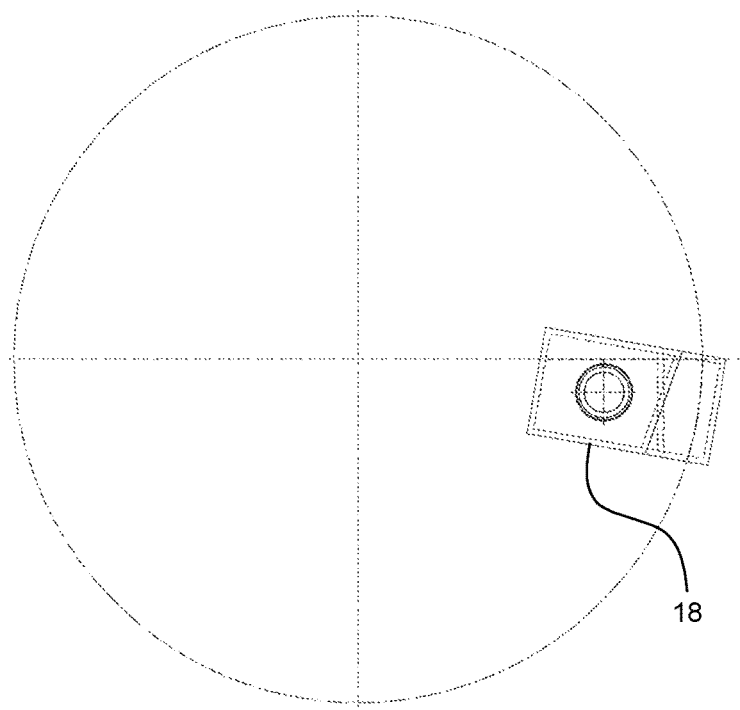

The embodiment of FIGS. 7 and 8 is optimized so that cutting plates 18 are not weakened by transverse openings for clamping screws, but are clamped by the segments of an annular leaf spring 58 in their respective plate seats in base body 14. This solution can also reduce the manufacturing- and assembly costs. Leaf spring 58 is axially clamped by central screw 60, in which the spring segments are held in plate seats 20 by lugs 62. The redundancy in more than three cutting plates 18 as well as geometric deviations are compensated by "spring deflection."

FIGS. 9 to 16 show various embodiments with cutting plates 18 formed as turning cutting plates. These each have two cutting edges 24, which are alternately engageable by loosening the clamping screw and suitably turning the cutting plate. An exact radial positioning is guaranteed despite coating 32 in that each cutting edge 24 is assigned to a reference surface 34, which can be brought into contact with positioning surface 36 on base body 14.

To maintain tight tolerances, cutting plates 18 can be wholly or partially ground. In another procedure, the diameter accuracy is increased in that the cutting plates are mounted on base body 14 and machine tool 10 is ground to the desired diameter, rotating around rotational axis 12. Cutting plates 18 are then removed again in a next step for coating. In this procedure, during the grinding process, the expected oversize needs to be maintained in the grinding size by the subsequent coating.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A metal cutting machine tool, comprising:
a base body rotatable around a rotational axis relative to a workpiece to be processed, the base body having a peripheral surface intersecting a front end surface, which is orthogonal to the rotational axis;
a plate seat arranged on the front end surface outside the rotational axis and having a positioning surface facing the rotational axis;
a tangentially mounted cutting plate held in the plate seat by a fastener, the cutting plate having a cutting edge and a reference surface configured for radial positioning of the cutting edge, wherein (i) the reference surface abuts the positioning surface and faces away from the rotational axis, (ii) the reference surface is transverse to a shortest imaginary connecting line running through a radially outer point of the cutting edge and the rotational axis, and (iii) the connecting line encloses a smallest angle in a range of 80° to 90° with the reference surface;
the fastener having a longitudinal axis parallel to the rotational axis;
a coating provided on the cutting edge and on the reference surface;
wherein the plate seat has an axial support surface for abutting a bottom surface of the cutting plate, the axial support surface being arranged orthogonal to the rotational axis, the axial support surface is entirely disposed radially outward of the positioning surface; and
wherein the positioning surface is orthogonal to the axial support surface;
wherein the plate seat defines a free space radially inward of the positioning surface and wherein a radially inward facing surface of the cutting plate is spaced apart from an opposing surface of the plate seat whereby the free space defined by the plate seat allows radial inward compensating displacement of the cutting plate as a function of the thickness of the coating.

2. The machine tool according to claim 1, wherein the reference surface is orthogonal to the connecting line.

3. The machine tool according to claim 1, wherein the plate seat has a tangential support surface that lies parallel to a plane spanned through the rotational axis and the radially outer point of the cutting edge or encloses a smallest angle between 0° and 20° with the plane.

4. The machine tool according to claim 1, wherein the cutting plate has a substrate formed from metal or cermet.

5. The machine tool according to claim 1, wherein the cutting edge is soldered to a substrate.

6. The machine tool according to claim 1, wherein the coating comprises a ceramic or diamond material coating.

7. The machine tool according to claim 1, wherein the coating comprises ceramic or diamond and has a hardness with a Vickers Number of more than 800 HV.

8. The machine tool according to claim 1, wherein a thickness of the coating at the cutting edge and on the reference surface is substantially the same.

9. The machine tool of claim 8, wherein the thickness of the coating is in a range of 0.5 to 50 μm.

10. The machine tool according to claim 1, wherein the positioning surface is arranged in a recess adjacent the axial support surface.

11. The machine tool according to claim 1, wherein the fastener is detachable, the fastener being engageable with the plate seat and extending through an opening in the cutting plate, and in an installed state, the fastener is eccentrically disposed in the opening in the cutting plate whereby a force component directed against the positioning surface is applied to the cutting plate.

12. The machine tool according to claim 1, wherein the fastener is a clamping screw or a clamping spring.

13. The machine tool according to claim 1, wherein the cutting edge has been ground to a desired diameter of the machine tool in an uncoated state of the cutting plate.

14. The machine tool according to claim 1, wherein the cutting plate comprises at least two alternately engageable cutting edges and associated reference surfaces.

15. The machine tool according to claim 1, wherein the plate seat is formed by a replaceably fixable cutting plate holder on the base body.

16. The machine tool according to claim 1, wherein the position of the positioning surface is adjustable.

17. The machine tool according to claim 1, wherein the fastener is a threaded fastener.

18. The machine tool according to claim 1, wherein the radially inward facing surface is spaced apart in its entirety from the opposing surface of the plate seat.

19. The machine tool according to claim 10, wherein the axial support surface is entirely disposed radially outward of the recess.

20. The machine tool according to claim 1, further comprising a clamping wedge on the front end surface for providing additional radial clamping of the cutting plate.

* * * * *